United States Patent [19]
Maruki et al.

[11] Patent Number: 5,961,751
[45] Date of Patent: Oct. 5, 1999

[54] SURFACE PROCESSING METHOD FOR A STEEL MEMBER AND SURFACE PROCESSED STEEL MEMBER

[75] Inventors: Michio Maruki, Kariya; Takao Taniguchi, Okazaki; Kouji Ohbayashi, Nagoya; Yoshimi Watanabe, Okazaki; Naohisa Momiyama, Hekinan, all of Japan

[73] Assignee: Aisin AW Co., Ltd., Japan

[21] Appl. No.: 08/632,805

[22] Filed: Apr. 17, 1996

[30] Foreign Application Priority Data

Apr. 17, 1995 [JP] Japan .................................. 7-091202
Dec. 7, 1995 [JP] Japan .................................. 7-345160

[51] Int. Cl.$^6$ ........................................... C21D 1/09
[52] U.S. Cl. ........................................... 148/512; 148/565
[58] Field of Search .................................. 148/512, 525, 148/565

[56] References Cited

U.S. PATENT DOCUMENTS

| | | | |
|---|---|---|---|
| 3,773,565 | 11/1973 | Pyu et al. ........................................ | 148/1 |
| 4,398,966 | 8/1983 | Kelly et al. ..................................... | 148/512 |
| 4,486,240 | 12/1984 | Sciaky ........................................... | 148/565 |
| 4,720,312 | 1/1988 | Fukuizumi et al. ............................. | 148/512 |

FOREIGN PATENT DOCUMENTS

| | | |
|---|---|---|
| 2173303 | 5/1973 | France . |
| 1404865 | 3/1975 | United Kingdom . |

OTHER PUBLICATIONS

Patent Ab. of Japan vol. 14, No. 17, Oct. 16, 1989, 1–259118.
Härterei Technische Mitteilungen, vol. 27, No. 2 1972, pp. 85–91.
Thin Solid films, vol. 84, No. 4, Oct. 1981 pp. 341–346, Joe E. Jenkins.

Primary Examiner—George Wyszomierski
Attorney, Agent, or Firm—Lorusso & Loud

[57] ABSTRACT

A surface hardening method, in which a surface layer on a thin steel plate member is stably melted and solidified to provide a high surface resistance against wear includes irradiation with a high density energy beam to melt a process surface portion of the steel member followed by rapid cooling. The melted surface portion includes a fully melted layer and an adjacent imperfectly or partially melted layer. At least the cooling to solidify the molten steel is performed in a short time period less than an austenitic transformation completion time at temperatures below melting, e.g., one-twentieth of the normal austenitic transformation time, and preferably both heating to melt the surface layer and cooling to solidify and harden the surface layer are performed in a time period less than the normal austenitic transformation completion time period. The high density energy beam can be divided to irradiate plural regions to melt the surfaces of the plural regions at the same time. The thermal capacity (or thickness) of the entire steel member can be designed to be as small as four times the thermal capacity of the process portion (or depth of melted portion) and still allow self cooling of the steel member to produce surface hardening. Additionally the melted-hardened surface has improved smoothness such as exhibited by a roughness which is only sixty percent or less of the roughness of non-processed surfaces.

17 Claims, 10 Drawing Sheets

FULLY MELTING LAYER    IMPERFECTLY MELTING LAYER

SURFACE PROCESSING METHOD FOR A STEEL MEMBER AND SURFACE PROCESSED STEEL MEMBER

BACKGROUND OF THE INVENTION

1. Field of the Invention

This invention relates to a surface processing method for a steel member accompanied with local melting of the surface of the steel member and to a surface processed steel member having a locally melted and solidified surface layer.

2. Description of Related Art

Along with recent significant improvements in automobile performance, torque converters in power transmission systems of an automobile have also been improved. Torque converters such as shown in FIGS. 1 and 2 provide smoother power transitions than the conventional mechanisms and provide improved gas mileage. A typical torque converter includes a pump impeller 1, a turbine runner 2 forming a torus with the pump impeller 1, a stator 3, a lockup clutch assembly 4, and a damper device 5.

In the torque converter, the engine rotational output through a crankshaft (not shown) is directly coupled to a front cover 6 and the pump impeller 1 fixed to the front cover 6 while the turbine runner 2 is directly coupled through hub 7 to an input shaft (not shown) of an automatic transmission (not shown). When the pump impeller 1 rotates, oil or hydraulic fluid under centrifugal force is circumferentially distributed in the converter torus and is driven by the impeller 1 to rotate with the converter cover or casing around the axis of the torque convertor. The fluid also circulates among the pump impeller 1, the turbine runner 2, and the stator 3. The stator 3 is mounted at its radially inner side on a one-way clutch 31 so as to be rotatable only in a fixed direction and is disposed between the pump impeller 1 and the turbine runner 2. When the pump impeller 1 initially starts rotating and has a large rotational speed difference from the turbine runner 2 such as when the vehicle starts moving, the torque converter operates as a torque converting mechanism to amplify the torque. The rotational speed difference between the turbine runner 2 and the pump impeller 1 decreases as the rotational speed of the turbine runner 2 is increased until the torque converter works simply as a fluid coupling between the turbine runner 2 and the pump impeller 1.

The torque converter includes the lockup clutch assembly 4 to improve gas mileage. That is, when the vehicle reaches a predetermined speed, the lockup clutch piston 41 in the lockup clutch assembly 4 is forced in the axial direction by fluid pressure in response to switching a hydraulic supply by a lockup relay valve or valves (not shown) to engage the piston 41 with the front cover 6 through a friction member 42. The engine rotation is then transmitted directly to the input shaft of the transmission without slippage of the fluid coupling of the torque converter, thereby improving the gas mileage.

The damper device 5 is attached to the torque converter to absorb shocks and vibration caused by abrupt changes of transmission torque occurring when the lockup clutch piston 41 and the front cover 6 are engaged and disengaged. The damper device 5 has input or driving members 50 secured to the lockup clutch piston 41 by rivets 43 formed by hammered heads of protruding portions of the clutch piston plate 41, has a driven plate 51 fixedly mounted on a hub 7 with the turbine runner 2, and has circumferentially disposed springs 52, 53 resiliently interposed between the driving and driven members 50 and 51.

The springs 52 are a first stage and are arranged at eight positions in a circumferential direction of the lockup clutch piston 41; the springs 53 are a second stage and are arranged at four positions in the circumferential direction of the lockup clutch piston 41; the springs 53 are placed inside every other spring 52. The spring 53 has a smaller diameter and is shorter than the spring 52; a helix angle of the spring 52 represents a predetermined set compression value of the spring 53; the spring 53 starts to flex after the transmission torque reaches the value of the bending point torque. When the rotational torque is transmitted from the front cover 6 through the friction member 42 and the damper device 5 to the turbine hub 7, the springs 52, 53 are compressed or flexed to absorb abrupt changes in the transmitted torque during engagement and disengagement of the lockup clutch. The springs 52, 53 can also prevent vibration and noise from occurring due to sudden changes in the output torque of the engine passing to the transmission mechanism (not shown) while the lockup clutch is engaged at higher vehicle speeds.

While the lockup clutch in the above described torque converter is engaged, the springs 52 are compressed by rotation of the lockup clutch piston 41 in a normal driving direction (counterclockwise direction in FIG. 2) relative to the driven plate 51 and are compressed by rotation of the lockup clutch piston in a reverse direction (clockwise direction in FIG. 2) relative to the driven plate 51 when the engine brake is applied or the like to cause the springs 52 to slide repetitively on flat portions 411 of the lockup clutch piston 41. This raises a problem in that the flat portions 411 of the lockup clutch piston 41 wear due to the sliding with the springs 52. Because of centrifugal force from the rotation of the lockup clutch piston 41, the springs 52 are forced radially outward into engagement with a riser portion 412 of the lockup clutch piston 41. During the normal and reverse rotation of the lockup clutch piston 41 relative to the driven plate 51, the riser portion 412 of the lockup clutch piston 42 also slides on the springs 52 repetitively, and is worn as a matter of course.

Generally, one typical prior art approach to prevent such wear caused by sliding actions between different members is to use hard or rigid materials in the members. However hard materials are difficult to mold or fabricate. In particular, hard steel materials cannot be practically employed to form the lockup clutch piston 41, on which plastic working such as pressing molding, riveting or the like is implemented.

Another prior art technique used on steel members is to increase wear resistance by hardening only the surface layer of the steel member. Surface hardening methods such as high frequency hardening, electron beam (EB) hardening, and laser hardening have previously been known. With these methods, the surface of the steel member is heated by high radio frequency energy, laser radiation or a high density electron beam. The heating is stopped when the surface layer of the material reaches a hardening temperature (austenitic temperature) and then the austenite formed at the surface layer is transformed to martensite by rapid cooling by means of self-cooling to form a hard surface layer.

The conventional surface hardening methods require that the surface layer of the material be kept at the hardening temperature by surface-heating for the austenitic transformation time (austenitic transformation completion time) to obtain uniform austenite to implement hardening. As shown in a T-T-A curve diagram for carbon steel in FIG. 3, the hardening temperature must be maintained for a period of time shown by a dotted line (e.g. one second or more) to complete transformation of the steel from ferrite-pearlite to austenite.

Consequently, relatively thin plate materials being hardened by conventional surface hardening techniques will be heated through a substantial portion or all of their thickness because of thermal conductance or heat transfer of the material during the austenitic transformation period; this extensive heating results in deforming the material due to thermal stress, and ineffective hardening of the material due to insufficient self-cooling.

SUMMARY OF THE INVENTION

It is an object of the invention to provide a surface processing method for relatively thin steel members with reduced tendency for being deformed and for insufficient hardening, and with the capability of stably hardening a desired surface portion with high processing reliability and efficiency.

It is another object of the invention to provide a surface processed steel member with a superior hardened surface portion formed with minimum stress.

A surface processing method for a steel member according to the invention is largely characterized in steps of melting only a surface of a portion of the steel member by high density energy beam irradiation, and rapid cooling of the melted portion to provide a steel member having a hard surface portion with excellent resistance against wear while maintaining a good plastic workability and dimensional accuracy as a steel member.

It is desirable, in accordance with additional features of the invention, that a processed surface portion be formed of a fully molten layer and a semi-molten, or imperfect molten layer, underlying the fully molten layer to suppress defective smoothness or corrugation that occurs when molten metal solidifies. If the surface of the processed portion is heated to the molten state in a short time less than an austenitic transformation completion time at a temperature for making austenite, the self-cooling effect is improved, and the depth of the hardened layer can be reduced. If the energy beam being radiated is divided to irradiate plural regions and if surface layers of the processed portions of the plural regions melt at the same time, processing cycle time can further be shortened since processing of plural regions can be implemented concurrently. Since the temperature increases due to heat transfer are limited to local surface regions of the lockup clutch piston, the respective thermally treated regions do not affect each other and annealing or tempering of adjacent hardened areas does not occur. Although the processing is simple because rapid cooling of the melted portion is accomplished by self cooling, forced cooling such as by water quenching can be employed. By setting the thermal capacity of the thickness of the steel member four or more times the thermal capacity of the heated surface portion, rapid cooling and hardening are insured. The rapid cooling effect, by such a design, occurs since heat is rapidly transferred from the melted portion to the unheated mother portion. Because of the very rapid melting and cooling of the thin surface portion, it is possible to surface harden a thin steel member without stress and distortion. Accordingly, the invention makes possible the reliable manufacture of steel members with a combination of thin portions having surfaces hardened for wear resistance and adjacent non-hardened portions that have good plastic workability. Localized non-stressful and distortion-free hardening is enhanced when self cooling is employed because the time period required for melting and cooling can be minimized. It is to be noted that when the thickness of the steel member is uniform, a thickness of the steel member four or more times the depth of the melted portion, attains the same rapid cooling effect as the thermal capacity of the non-heated portion being four or more times the thermal capacity of the molten portion.

A surface processed steel member in accordance with another aspect of the invention is characterized by having a mother metal with good plastic workability and a highly hardened surface portion produced by rapidly melting and cooling a localized surface layer of the mother metal to form a surface layer with excellent resistance against wear; hardening solidification is not made at portions except the melted hardened surface portion. Rapid melting can be performed by irradiation with a high energy beam, and rapid cooling can be performed by heat transfer to the underlying non-heated mother metal upon discontinuance of the irradiation. To harden a surface portion of a relatively thin steel member by rapid melting and cooling, the thermal capacity of the molten portion is set a quarter or less of the thermal capacity of the underlying mother metal, or alternatively the depth of the molten surface portion is set a quarter or less of the thickness of the member being processed. The hardened surface produced by rapid melting and rapid cooling of the localized surface layer of mother steel exhibits outstanding performance as a resistance face against wear.

Because only the surface of the portion being hardened is melted by radiation of the high density energy beam and subsequently rapidly cooled (hereinafter referred as to "melting-hardening"), the surface portion of the steel member being locally melted can be extremely thin or a very shallow layer so that melting occurs in a very short period (almost in a moment) upon irradiation by the high density energy beam such as an electron beam (EB) or a laser beam onto the surface of the steel member.

When the irradiating high energy beam is discontinued or shifted to another site, heat from the molten layer transfers very rapidly to the mother material because the heated and melted layer is extremely thin, so that the molten layer is rapidly cooled and solidified to a low temperature range in a moment without forced cooling. The inventors here report that they have confirmed that the solidified layer (including an extremely thin thermally affected partially molten layer underlying the fully molten layer) is transformed to uniform austenitic organization in a very short period simultaneous with the solidification of the melted layer. However, this austenitic organization occurs only momentarily during solidification since the austenitic organization is transformed quickly to a hardened organization (martensitic organization) due to the rapid self-cooling. Therefore, the surface portion of the steel member which is rapidly melted and rapidly cooled becomes very hard and is given excellent resistance against wear.

The melting-hardening method of the present invention overcomes the deficiencies of the conventional prior art methods because austenitic transformation of the surface of the processed portion is completed substantially instantaneously by melting and solidification to avoid the prior art requirement for holding the processed portion at the austenite forming temperature for the austenitic transformation completion time. Additionally the surface is hardened substantially instantaneously by the rapid cooling which forms martensite. The rapid melting and cooling shortens the processing time for surface hardening steel members. Since heat transfer is proportional to time, heating of regions adjacent the melted surface portion is minimized to prevent heat distortion of the steel member. Also heat transfer is proportional to temperature differential so that the minimal heating of the adjacent regions enhances the self-cooling ability by enabling rapid heat transfer from the molten surface to the relatively unheated adjacent regions. Since the melted and solidified portion is cooled in a short period (substantially instantaneously) to the martensitic transformation starting temperature or below, defective hardening due to formation of bainite is prevented. Accordingly, the present process can be performed on a thin steel member to form a processed surface portion with high hardness and excellent resistance against wear without heat distortion of the member and while maintaining good plastic workability at portions of the member outside of the processed portion. The melting and re-solidification of the surface layer of the processed portion of the steel member also reduces surface roughness of the processed portion (made smoother) by effects of gravity force, surface tension or the like.

Also the melting-hardening method according to the present invention prevents formation of a wavy or corrugated surface on the melted and solidified portion upon cooling by self-cooling or the like. When the locally hardened surface layer being formed at the surface of the steel member is controlled to include a fully melted layer and an underlying partially melted layer by adjustment or the like of the radiation of the high density energy beam (for example, lowering output energy or extending the radiation period), it is believed that the partially melted or softened layer serves as a buffer to absorb stress during low temperature transformation (martensitic transformation) to prevent formation of surface waviness. Additionally waviness or corrugation of the hardened surface may be prevented because of the reduction of the depth of the hardened and solidified layer. It is noted that the semi-melted layer has been confirmed by observation of the structure and by measurement of the hardening of a cut cross section through the melted-hardened portion of a member in the post-process stage.

It is preferable that the melting of the surface portion of the steel member by heating with irradiation of a high density energy beam be executed in a time period shorter than the austenitic transformation completion time period at the austenite making temperature (a temperature immediately below the melting temperature). Such a short heating period less than the "austenitic transformation completion time" can sufficiently melt the surface portion to implement a hardening process without waiting the austenitic transformation completion time required by prior art general thermal processes, because of the discovery that a uniform austenitic organization is accomplished instantly by solidifying the molten portion. As a result, the shortened heating period allows the melting-hardening process to be performed and avoids the deficiencies described above caused by the thermal accumulation occurring due to heating for the longer prior art austenite transformation completion time period.

BRIEF DESCRIPTION OF THE DRAWINGS

The above and other objects and features of the invention are apparent to those skilled in the art from the following description of the preferred embodiments when considered in conjunction with the accompanied drawings, in which.

DETAILED DESCRIPTION OF THE PREFERRED EMBODIMENTS

Figure 1:
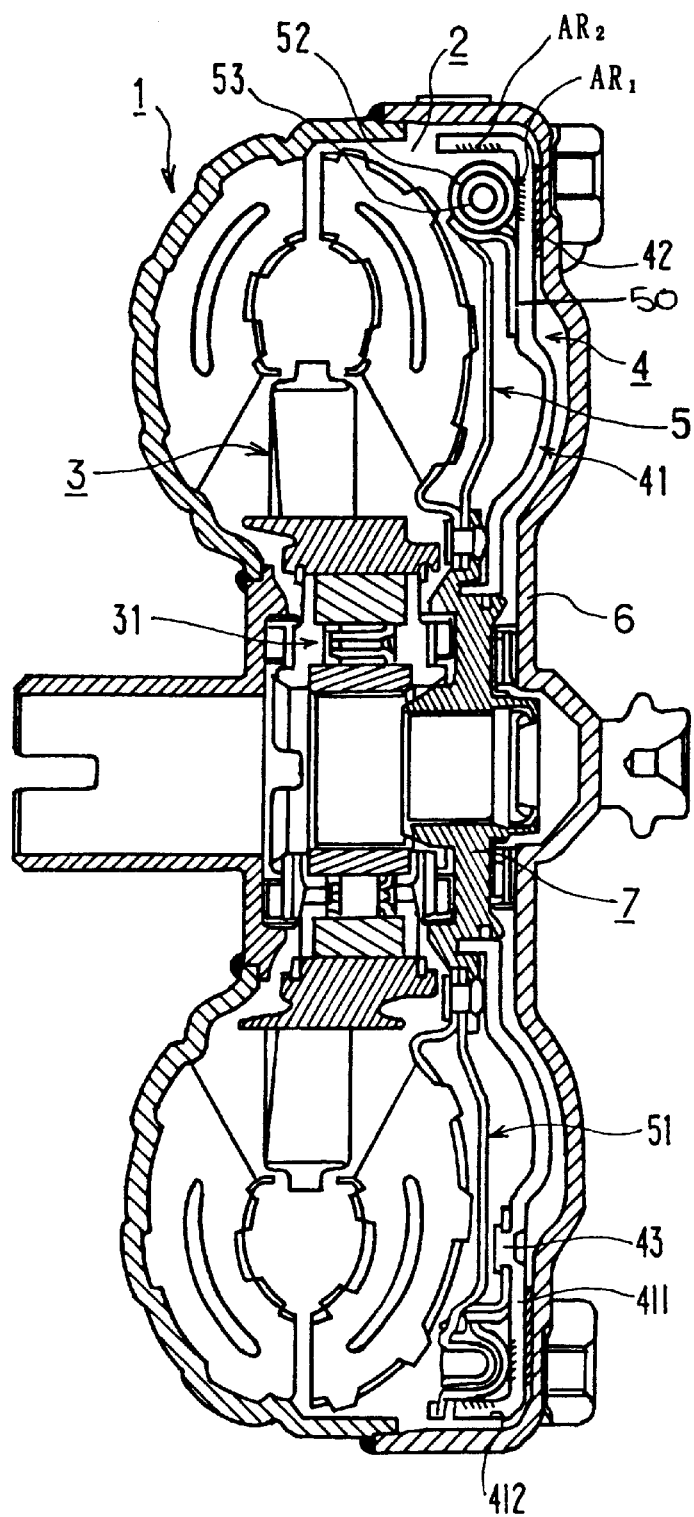
FIG. 1 is a vertical cross section of a torque converter having processed surface portions in accordance with the surface processing method and the surface processed member of the invention.
Figure 2:
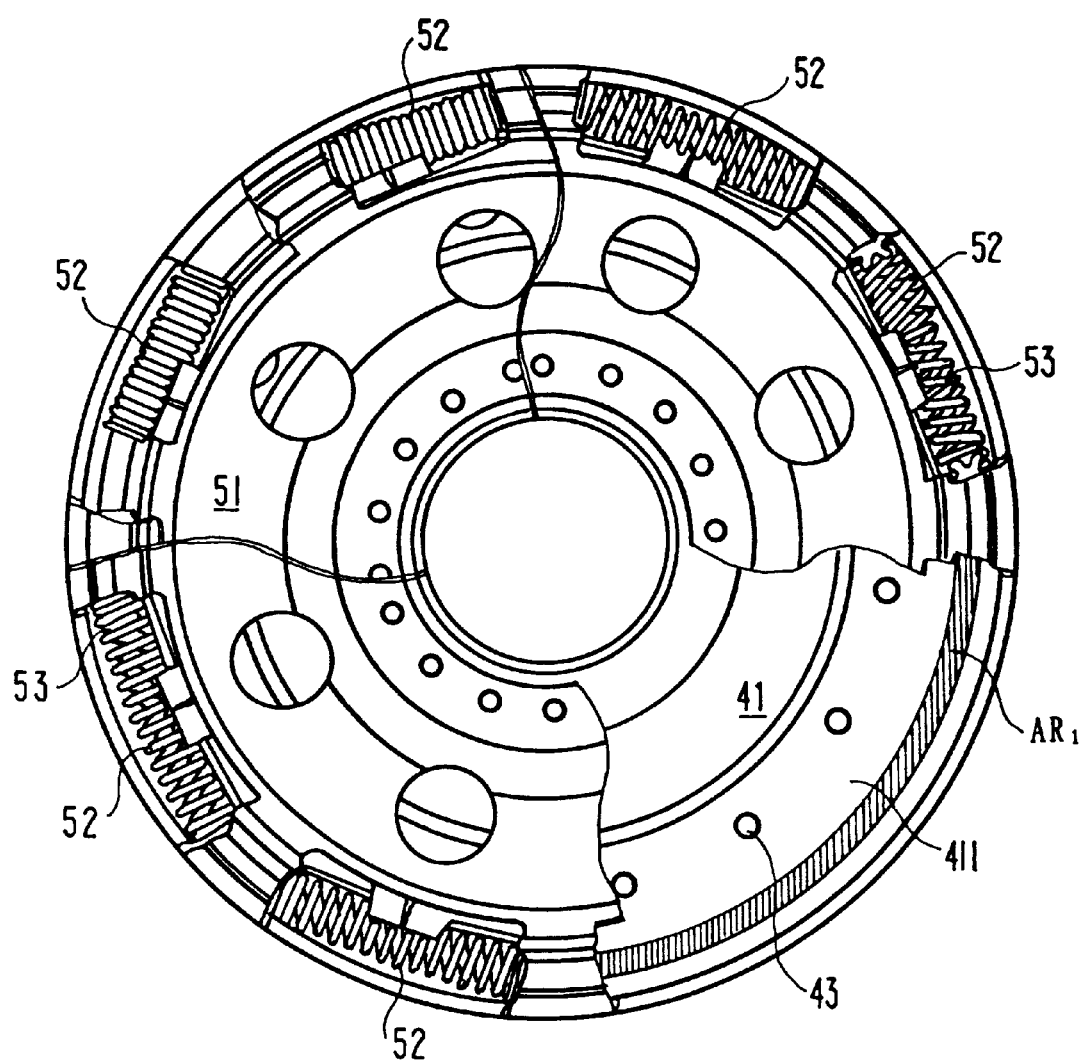
FIG. 2 is a plan view partially broken away of the torque converter in FIG. 1.
Figure 4:
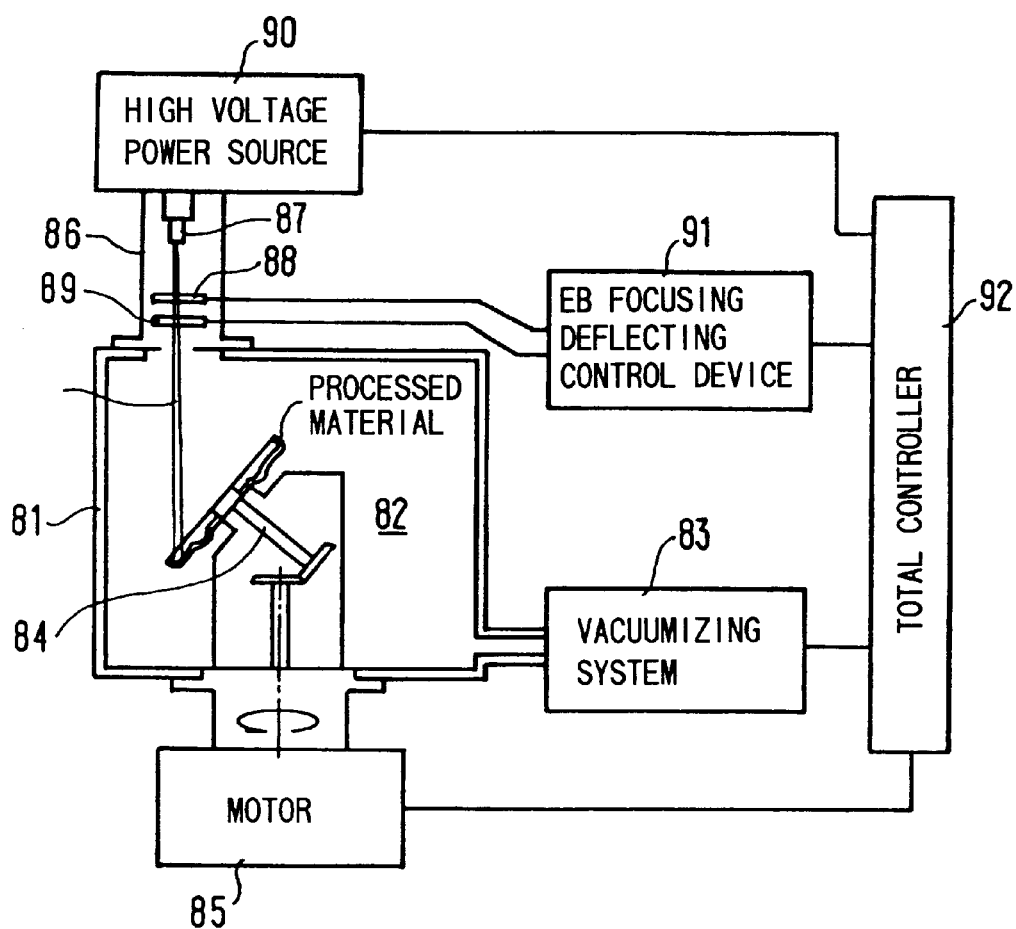
FIG. 4 is a diagrammatic view illustrating a melting-hardening apparatus to be used for the surface processing method and the surface processed member in accordance with the invention.

Referring to FIGS. 1, 2 and 4, a surface processed material or member subjected to a surface processing method in accordance with one preferred embodiment is based on an example in which an electron beam in a melting-hardening apparatus irradiates both annular section AR1 of flat portion 411 and annular section AR2 of riser portion 412 of a lockup clutch piston 41 for a torque converter to rapidly melt the surface portions AR1 and AR2. Rotation of the clutch piston in the melting-hardening apparatus causes relative shifting of the irradiating beam resulting in rapid cooling with substantially instantaneous hardening of the molten surface to form wear resistant faces on the clutch piston for sliding engagement with springs 52 of a damper device 5 of a clutch assembly 4.

In the melting-hardening apparatus of FIG. 4, the numeral 81 represents a vacuum working chamber casing having a sealing structure; the numeral 82 represents a vacuum working chamber surrounded by the vacuum working chamber casing 81; the numeral 83 is a vacuum system for forming a vacuum in the vacuum working chamber 82. In the vacuum working chamber 82, a processed material supporting shaft 84 is provided for rotation by a motor 85 mounted outside the vacuum working chamber casing 81. A beam pipe 86 is connected to the vacuum working chamber casing 81. An electron beam gun 87 is attached to one end of the beam pipe 86. A focusing lens 88 is formed on a downstream side of the electron beam gun 87 for focusing an electron beam BM generated by the electron beam gun 87. A beam deflector 89 is formed on a downstream side of the focusing lens 88 for deflecting the electron beam BM to change or scan the electron beam on the article being irradiated.

A high voltage power source 90 is connected to the electron beam gun 87. The focusing lens 88 and the deflector 89 are connected to an EB focusing deflecting control device 91. A total controller 92 is provided to control the vacuum system 83, the motor 85, the high voltage power source 90, and the EB focusing deflecting control device 91.

Using the melting-hardening apparatus, processed surface regions AR1 or AR2 (see, FIGS. 1, 2) are easily melted and hardened to form wear resistant parts of a lockup clutch piston made of molded low carbon steel (S22C) as mother metal. The melting-hardening process is completed by supporting the lockup clutch piston coaxially on the processed material supporting shaft 85 in the melting-hardening apparatus and then irradiating the regions AR1 or AR2 with the electron beam BM (output: 4.6 kW) while rotating the clutch piston by the shaft 85. The rotational traveling speed of the processed regions is adjusted or controlled, for example, at 16.7 m/min.

The irradiation by the electron beam heats the target surface portions of the lockup clutch piston material to a melting temperature of 1500° C. or above, and the rotation of the clutch piston continuously moves the melted surface portion in a circumferential direction from the electron beam path to an adjacent position. The heat of the molten surface portion is quickly (almost instantly) transferred to the unheated main portion, or the mother metal portion, to solidify the molten surface portion. Simultaneous with the solidification, the solidified portion becomes austenitic. Further rapid self-cooling hardens the solidified surface portion by directly transforming austenite into martensite.

Figure 5:
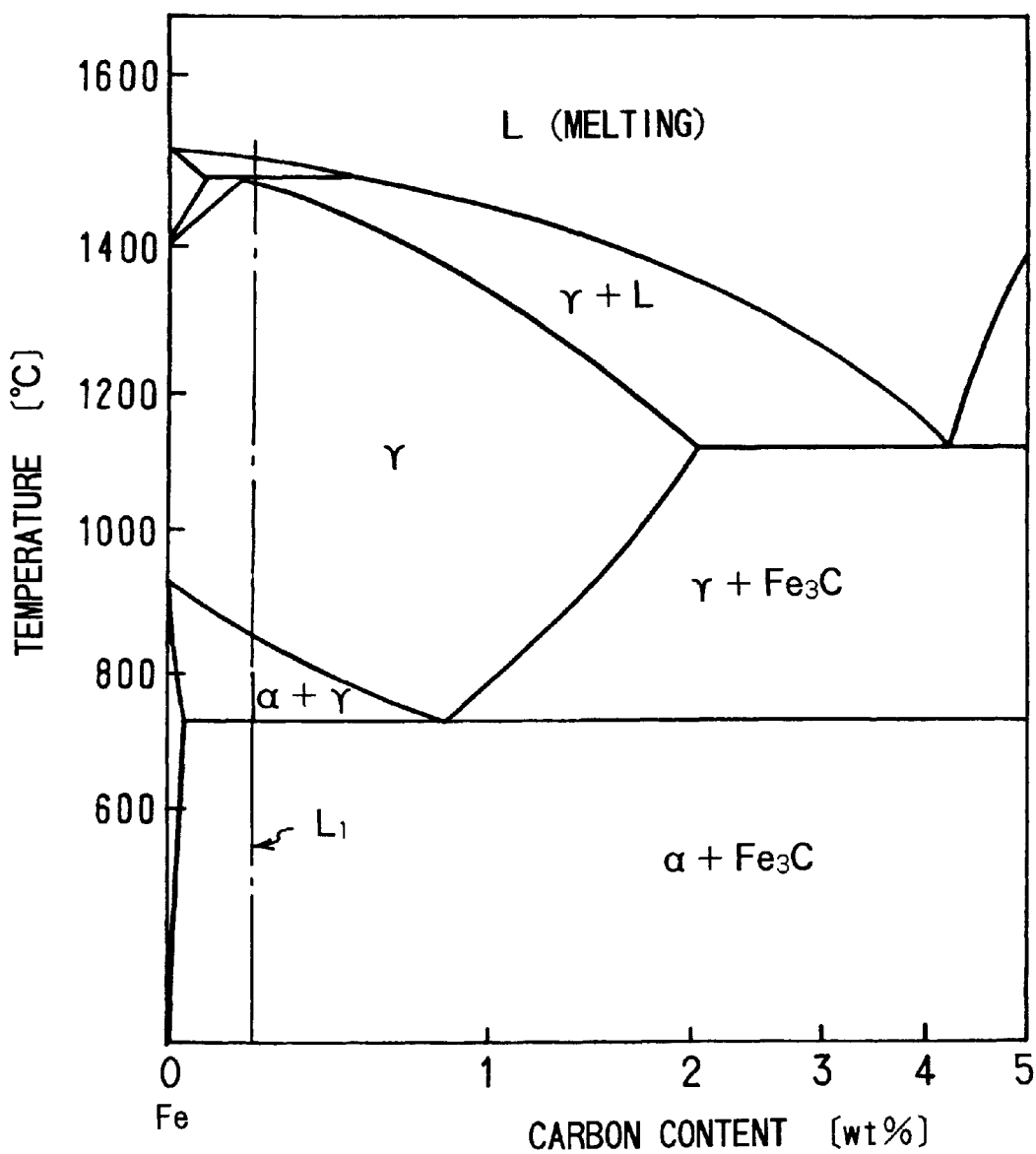
FIG. 5 is an equilibrium state diagram of a steel and carbon system.

FIG. 5 shows an equilibrium state diagram of iron-carbon system showing changes by dash-dot line L1 of the crystalline organization of the processed portions under the present process. First, a normal temperature organization (α-iron or ferrite-pearlite) is heated and melted by the electron beam to form a molten body L. Upon discontinuance of irradiation the molten material is solidified by self-cooling to form austenite (γ-iron). Immediately after austenite is formed, the body is rapidly cooled further by self-cooling to conduct hardening, thereby forming martensite as a low temperature transformation organization. Accordingly, since the surface of the processed portion is made harder, the resistance against wear is improved.

Figure 6:
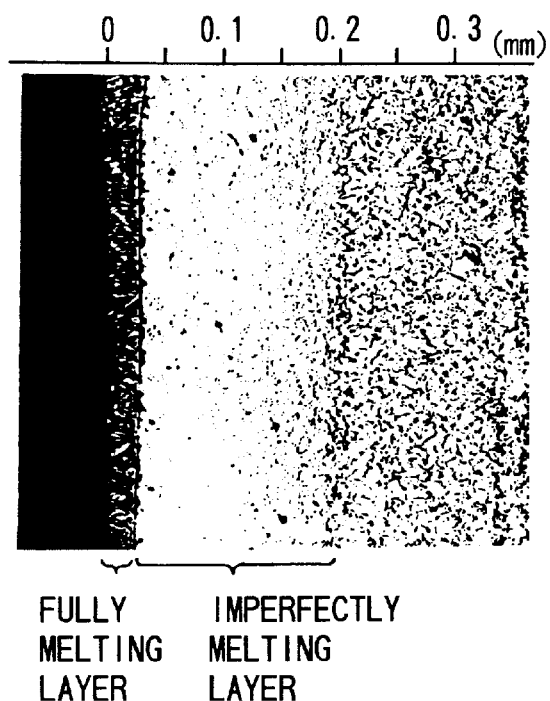
FIG. 6 is a metal organization micro photograph showing a cross section of the steel member subject to a melting-hardening process.
Figure 7:
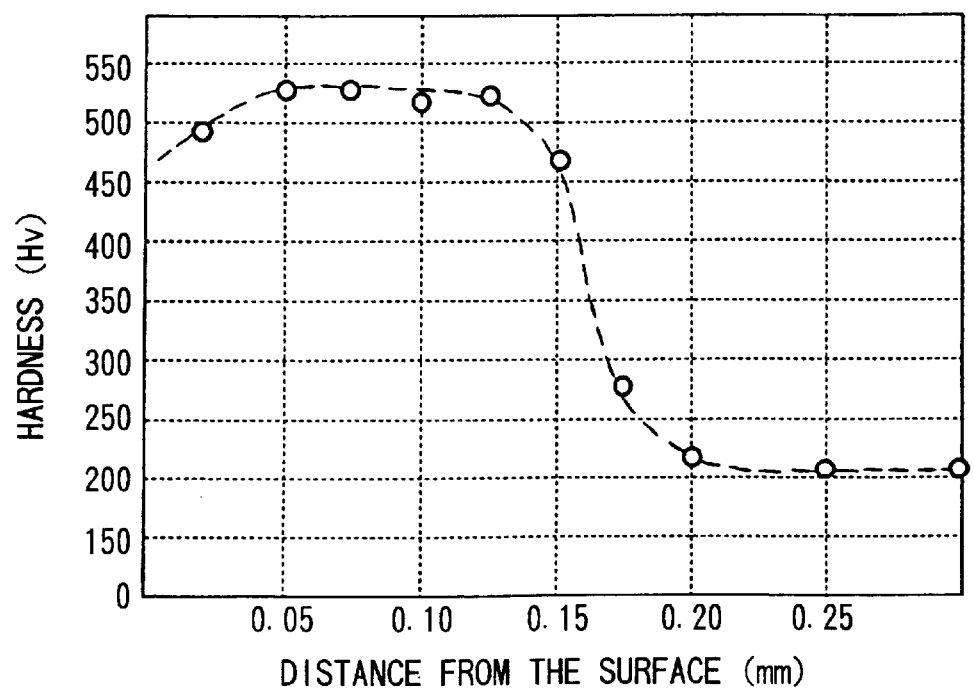
FIG. 7 is a graph showing a hardness profile of the cross section of a steel member subject to the melting-hardening process.

FIG. 6 shows crystalline organization in a cross section of the melted and hardened material thus obtained. FIG. 7 illustrates by the graph measured results of a hardness profile regarding the cross section. As apparent from these results illustrated in FIGS. 6 and 7, the hardened surface made by the present melting-hardening method is made very hard and smooth and has a high resistance against wear, even though very shallow. From FIG. 6, the partially or imperfectly melted layer can be confirmed wherein a melted portion adjacent to the fully melted layer and a heated but non-melted portion are mingled.

Figure 3:
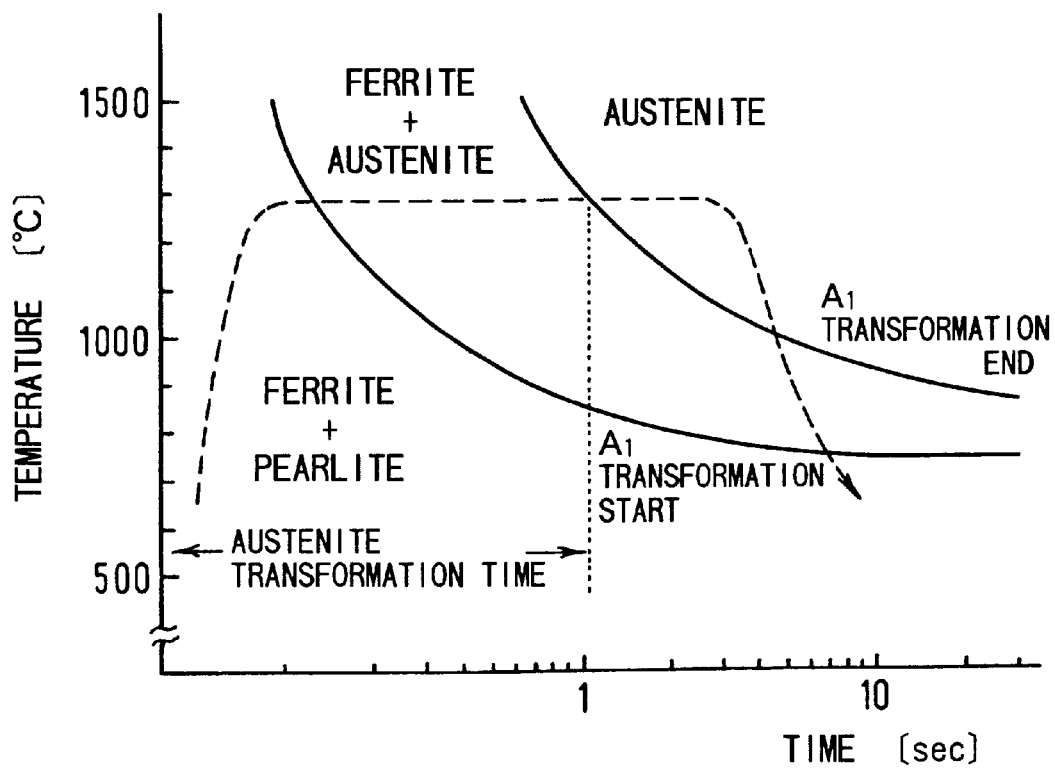
FIG. 3 is a T-T-A curve diagram for carbon steel.

As described above and as apparent from the T-T-A curve diagram of FIG. 3, conventional surface hardening by irradiation with an electron beam is performed without melting the processed portions but rather forms austenite by holding at a temperature below the melting temperature for the austenitic transformation time period required for transforming the crystalline organization of the processed portion to austenite. Although the transformation time is made shorter as the heating temperature is made higher or closer to the melting temperature, a considerable heating time (e.g., one second or more) is still required to complete the austenitic transformation. However, when the melting-hardening process according to the present invention is implemented, the austenitic crystalline organization of the processed portion is formed in a much shorter period of time (i.e. substantially instantaneously) simultaneously with solidification of the molten surface portion. Heating a very thin surface layer to the melting temperature of 1500° C. or above to melt the thin surface layer is performed in a short time period (instantly) and subsequently cooling the processed portion to harden the surface layer is likewise performed in a short time period (immediately) by the self-cooling. Even though hardening may be obtained by quenching irrespective of the time duration required to heat and melt the surface portion, for example in the range from about 0.05 second to about 0.5 second, or the time period that the surface portion is held in the molten state (for example, up to one second), it is advantageous to melt the surface portion in the shortest possible time period such as within 0.05 second or less and to immediately solidify and harden the molten portion in view of factors such as processing efficiency and adverse influence from thermal conductance. A short processing time minimizes temperature increase through thermal conductance to the surrounding or underlying portions of the member to reduce the accumulated amount of thermal energy in the processed member, thereby improving the self-cooling effect and preventing impairments such as thermal stress or distortion of the member.

In the prior art conventional surface hardening process by irradiation with an electron beam, the thermal capacity of the underlying lockup clutch piston material must be set to eight or more times the thermal capacity of the portion being hardened (in other words, the member must have considerable thickness), whereas in the present method, surface hardening is possible with much smaller thermal capacities, and as a result, the lockup clutch piston material can be thinner. For example, a material having about one-half of the thickness required by conventional electron beam hardening can be treated readily in accordance with the present melting-hardening method.

Figure 8:
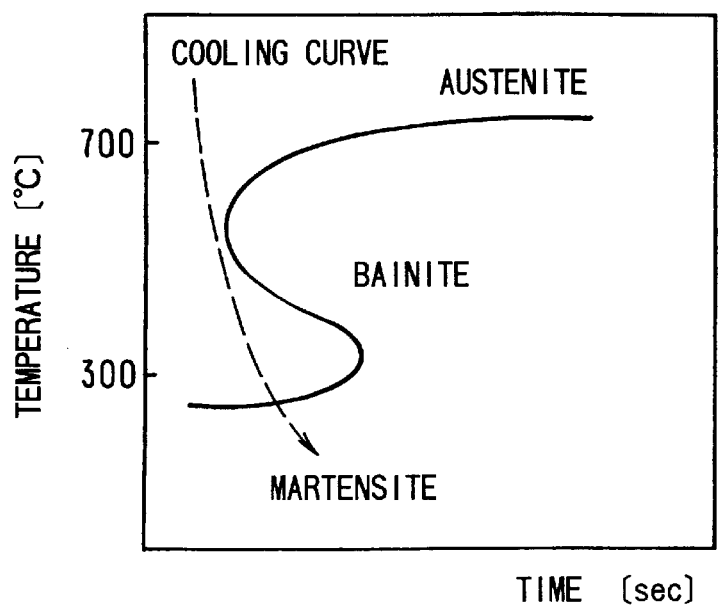
FIG. 8 is a diagram for T-T-T curve for carbon steel.
Figure 9:
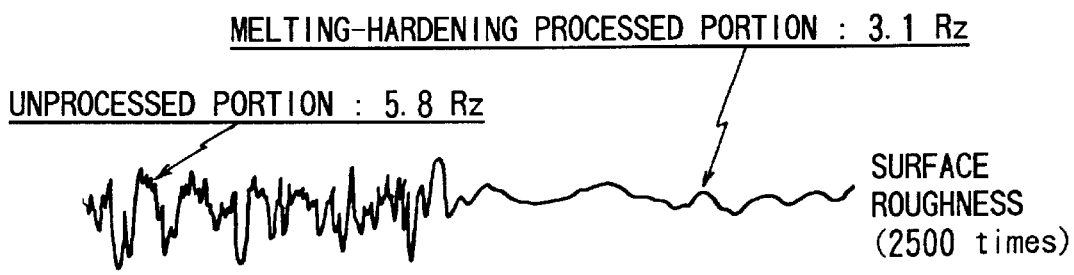
FIG. 9 is a graph indicating surface roughness (Rz) comparing a portion subject to the melting-hardening process with a portion not subject to the melting-hardening process.

Since the lockup clutch piston material is surface hardened in a very short time period including the time to cool the material being hardened to the martensitic transformation temperature, as apparent from the T-T-T curve diagram of carbon steel indicated as FIG. 8, a crystalline organization such bainite is never formed at the processed portion, and therefore, defective hardening is obviated. In addition, the solidified portion processed according to the present melting-hardening method has a significantly improved surface smoothness since the surface layer is solidified after being melted. The graph of FIG. 9 compares surface roughness (Rz) of a portion of the lockup clutch piston material processed according to the present melting-hardening method with surface roughness of a non-processed portion. As apparent from FIG. 9, the surface roughness at the portion processed according to the present method is reduced and made smoother; for example, the surface roughness of the processed portion is sixty or less percent of the surface roughness of non-processed portions.

As described above, the lockup clutch piston material processed according to the present method has excellent resistance against wear since the desired surface portion is highly hardened, and the non-processed portions are not hardened and remain malleable so that plastic working, for example, forming rivets (a boss in a united body of casing whose head is hammered, a Tox™ rivet, or the like), can be performed in such non-hardened portions. Since the temperature is not increased in any wide region of the member during the process, thermal deformation causing loss of dimensional accuracy does not occur (for example, distortion of the front cover side of the lockup clutch piston is avoided insuring the flatness of the surface to which a friction member is attached) so that the lockup clutch device is engaged smoothly.

In the melting-hardening apparatus shown in FIG. 4, the electron beam BM generated by the electron beam gun 87 is deflected by the beam deflector 89 so that the electron beam can be directed to impinge upon selected portions of the clutch piston as desired and so that the electron beam can be rapidly switched to irradiate plural regions being subjected to the melting-hardening process in parallel at the same time.

Figure 10:
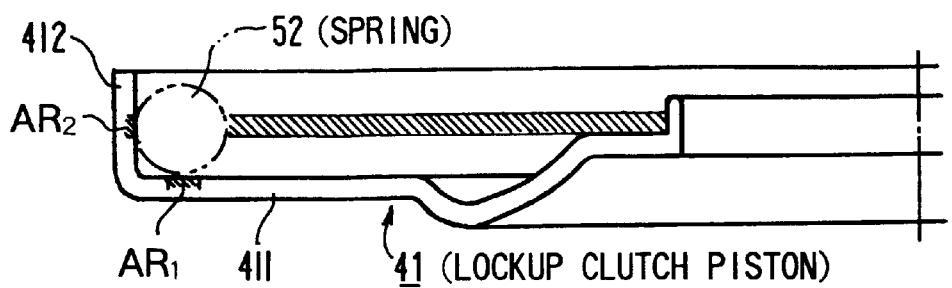
FIG. 10 is a sectional view showing processed regions of a lockup clutch piston.
Figure 11:
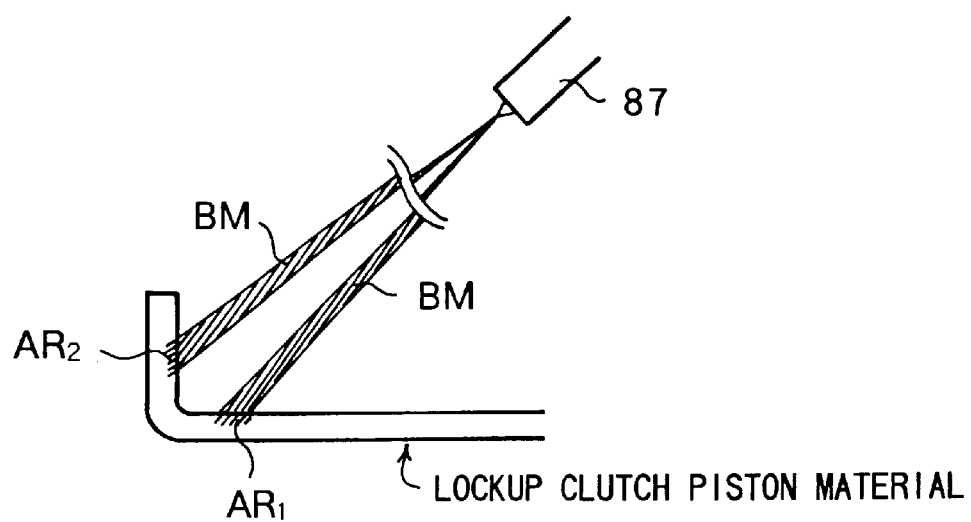
FIG. 11 is a diagrammatic illustration showing radiation by a split electron beam to two regions being processed.

FIG. 10 illustrates two surface processed regions AR1 and AR2 of the lockup clutch piston 41 extending around the entire circumference of the lockup clutch piston 41; the annular region AR1 being formed on a flat plate portion 411 of the lockup clutch piston 41 and the annular region AR2 being formed on a riser portion 412 of the lockup clutch piston 41. To subject the two regions at the same time in parallel to melting and hardening, the electron beam BM may be deflected as shown in FIG. 11. The electron beam BM from the electron beam gun 87 is deflected by the beam deflector 89, FIG. 4, and repeatedly directed to the regions AR1 and AR2 alternately. The processed regions AR1, AR2 are melted and hardened at the same time in parallel by the electron beam irradiation.

Figure 12:
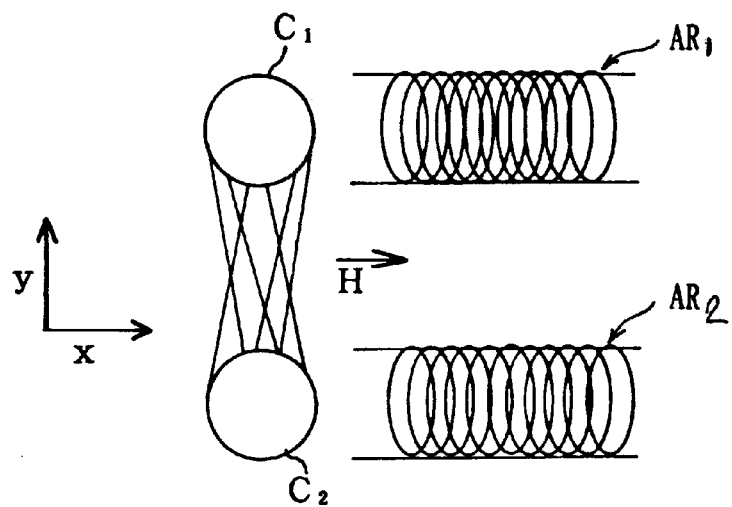
FIG. 12 is a diagram showing a radiation trace of the electron beam.
Figure 13:
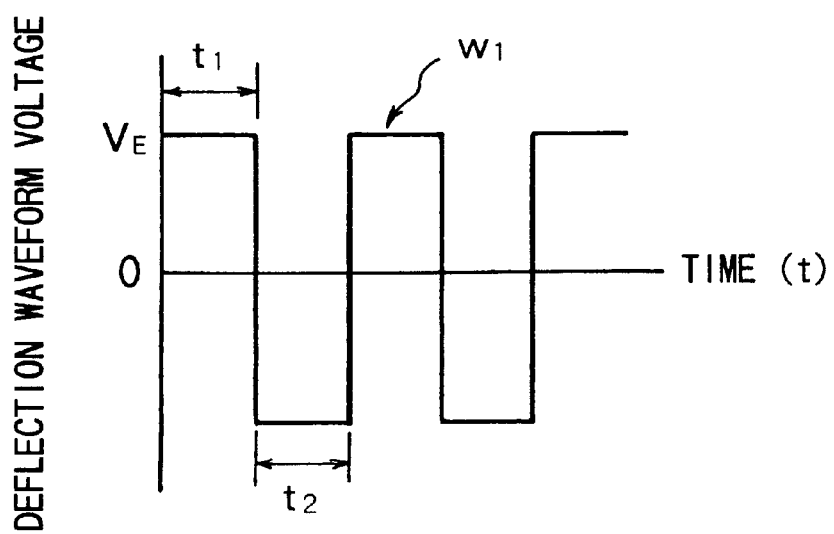
FIG. 13 is a waveform diagram showing a signal for deflecting the electron beam for radiation according to FIG. 12.

An example of a deflection pattern or trace of the electron beam BM is shown in FIG. 12. In the example shown in FIG. 12, the electron beam BM when directed to the respective regions AR1, AR2 is deflected along the respective circular traces C1, C2 to heat the processed regions AR1, AR2. During this irradiation, the lockup clutch piston is rotated around its central axis so that the circular traces of the electron beam BM travel in the direction of arrow H in the processed regions AR1, AR2. The respective circular traces C1, C2 are formed by combinations of sinusoidal deflection waveforms in x-axial and y-axial directions. To radiate the electron beam BM alternately on the processed regions AR1, AR2 by switching between the circular deflected traces C1, C2, a deflection waveform W1 as shown in FIG. 13 is generated and superimposed on the deflection waveforms in the y-axial direction. Therefore, the electron beam BM is radiated on the region AR1 during time $t_1$ that the voltage VE is a plus value and on the region AR2 during time $t_2$ that the voltage VE is a minus value.

Since the temperature does not increase significantly due to limited time for heat conductance in a wide region of the lockup clutch piston material, there is no thermal interference or transfer between the processed regions AR1, AR2, and therefore, unwanted tempering, annealing and the like is obviated. Furthermore, the plurality of processed regions AR1, AR2 are melted and hardened at the same time, so that thermal treating time can be reduced.

While the riser portion 412 of the lockup clutch piston needs high wear resistance because of high friction forces caused by the centrifugal force on the springs 52, the flat plate portion 411 does not need as high a wear resistance as that of the riser portion 412 since friction between the flat plate portion 411 and the springs 52 is not increased by centrifugal force. By setting the time $t_1$ of the deflection waveform W1 shorter and the time $t_2$ of the deflection waveform W1 longer, the thermally treated region AR1 can be made softer than the thermally treated region AR2. This enables further reduction of energy consumption for melting-hardening, as well as further reduction in working time.

Figure 14:
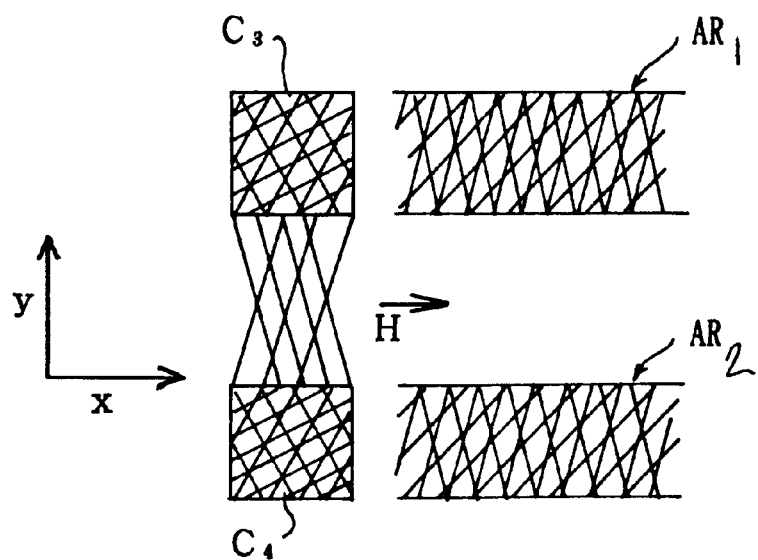
FIG. 14 is diagram showing an alternative radiation trace of the electron beam.

FIG. 14 shows another example of a deflection pattern or trace of the electron beam BM to produce melting-hardening on the processed regions AR1, AR2 at the same time in parallel. The electron beam EM is radiated along two linear or sawtooth traces $C_3$, $C_4$. That is, the processed regions AR1, AR2 are irradiated with the electron beam BM along the traces $C_3$, $C_4$, respectively, while the lockup clutch piston is rotated around its axis. The traces of the electron beam EM therefore travel in the direction of arrow H in the processed regions AR1, AR2.

Figure 15:
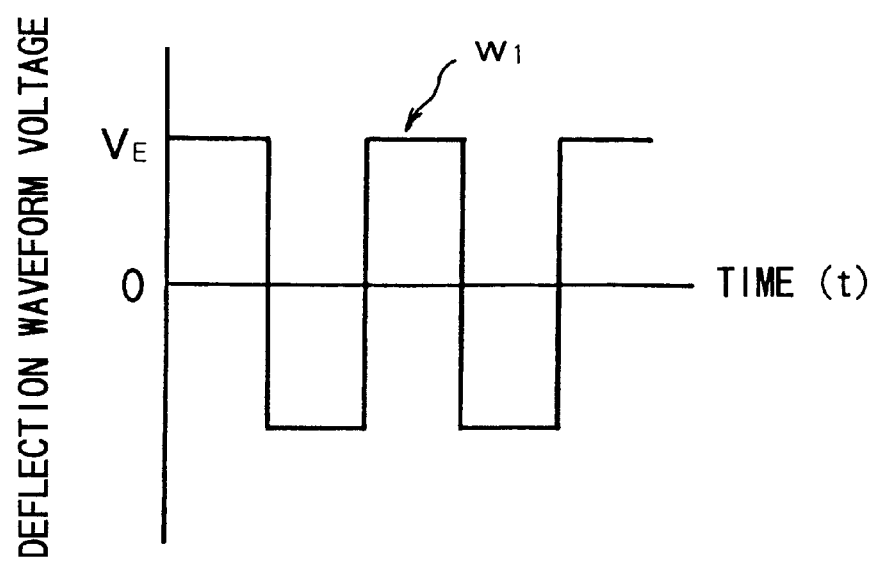
FIG. 15 is waveform diagram showing a signal for deflecting the electron beam for radiation according to FIG. 14.

The respective traces $C_3$, $C_4$ are formed by generating sawtooth deflection waveforms in x-axial and y-axial directions. To direct the electron beam BM alternately on the processing regions AR1, AR2 by switching between the traces C1, C2, a deflection waveform W1 as shown in FIG. 15 is superimposed on the separate waveform in the y-axial direction.

Although the above discloses circular, linear or sawtooth waveforms producing scanning of the electron beam on processing surfaces, various other deflection waveforms including ellipses, wavy lines, complex patterns, etc. can be used.

Although the above described embodiment is a single example, namely a lockup clutch piston of a torque converter, the present melting-hardening process can be used on any steel member having a surface layer desired to be hardened including plate slide portions in multi-plate friction engagement devices, couplers composed of members or snap rings, oil pump plates, seal rings, etc. Furthermore various steel members, other than the described lockup clutch piston, can be formed with a melted-hardened surface layer exhibiting superior smoothness and hardening without distortion.

The foregoing description of preferred embodiments has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not to be limited by the specification, but be defined by the claims set forth below.

What is claimed is:

1. A surface treatment method for treating a surface of a steel member comprising:

deflecting a high density energy beam for cyclical movement in a pattern defining at least one area of irradiation;

heating at least a first limited surface portion of the steel member, corresponding to said one area of irradiation, to at least the melting point of the steel, by irradiating the first limited surface portion with the high density energy beam, to form a fully melted surface layer within the first limited surface portion;

establishing relative movement between the surface of the steel member and said one area of irradiation, said relative movement having a speed whereby the fully melted surface layer remains melted for a period of time less than time required for complete austenitic transformation at an austenitic forming temperature; and rapidly cooling the fully melted surface layer to a martensitic transformation region to form a martensitic structure.

2. A surface treatment method for treating a surface of a steel member as set forth in claim 1, wherein the heating of the surface portion also forms an imperfectly melted layer underlying the fully melted surface layer portion.

3. A surface treatment method for treating a surface of a steel member as set forth in claim 1, wherein the melting of the surface portion is performed in a time period less than 0.5 seconds and is followed immediately by self-cooling.

4. A surface treatment method for treating a surface of a steel member as set forth in claim 1 wherein the time period for melting is equal to or less than 0.05 seconds, followed immediately by self-cooling.

5. A surface treatment method for treating a surface of a steel member as set forth in claim 1, wherein the high density energy beam is divided to irradiate a plurality of limited surface portions of the steel member, to thereby simultaneously melt the plurality of surface portions being irradiated.

6. A surface treatment method for treating a surface of a steel member as set forth in claim 1, wherein the rapid cooling is done by self-cooling.

7. A surface treatment method for treating a surface of a steel member as set forth in claim 1, wherein the thermal capacity of the full thickness of the steel member underlying the melted surface layer portion being irradiated is four or more times the thermal capacity of the melted surface layer portion.

8. A surface treatment method for treating a surface of a steel member as set forth in claim 1, wherein the thickness of the portion of the steel member being irradiated is four or more times the thickness of the melted surface layer portion.

9. A surface treatment method for treating a surface of a steel member as set forth in claim 1 wherein said steel member is carbon steel.

10. A surface treatment method for treating a surface of a steel member as set forth in claim 1 wherein said pattern further defines a second area of irradiation, said method additionally comprising subjecting a second limited surface portion of the steel member, spaced from the first limited surface portion and corresponding to said second area of irradiation, to said heating, moving and cooling, by switching the high density energy beam to alternately irradiate the first and second limited surface portions to form a fully melted surface layer within each of the first and second limited surface portions, thereby treating the first and second limited surface area portions in parallel at the same time.

11. A surface treatment method for treating a surface of a steel member as set forth in claim 10 wherein the steel member is cylindrical and defines a central axis, wherein said first and second limited surface portions are radially spaced and wherein said steel member is rotated about its central axis as said limited surface portions are irradiated to thereby treat surface areas of the steel member in the form of spaced and parallel, circular bands extending around the steel member.

12. A surface treatment method for treating a surface of a steel member as set forth in claim 11 wherein the pattern through which said high density energy beam is deflected includes two circular traces corresponding to the first and second limited surface portions.

13. A surface treatment method for treating a surface of a steel member as set forth in claim 12 wherein said electron beam is deflected in sinusoidal deflection waveforms in x-axial and y-axial directions and in a serrate deflection wave form superimposed on the waveform in the y-axial direction.

14. A surface treatment method for treating a surface of steel member as set forth in claim 12 wherein said relative movement displaces the circular traces so that circular traces corresponding to one of the first and second limited surface portions intersect but do not overlap the previous circular trace for the one limited surface portion.

15. A surface treatment method for treating a surface of a steel member as set forth in claim 11 wherein the pattern in which said electron beam is deflected includes first and second respective traces, corresponding to said first and second limited surface portions, said pattern being formed by generating saw tooth deflection waveforms in x-axial, y-axial directions and by superimposing a sawtooth deflection waveform on the waveform in the y-axial direction.

16. A surface treatment method for treating a surface of a steel member as set forth in claim 10 wherein said first and second limited surface portions are alternately irradiated for time periods $T_1$ and $T_2$, respectively, and wherein $T_1$ is shorter than $T_2$ whereby the second limited surface portion becomes harder than the first limited surface portion.

17. A surface treatment method for treating a surface of a steel member as set forth in claim 1 wherein said high density energy beam is an electron beam.

\* \* \* \* \*